(12) United States Patent
Lee et al.

(10) Patent No.: US 8,570,471 B2
(45) Date of Patent: Oct. 29, 2013

(54) OCB LIQUID CRYSTAL PANEL AND MANUFACTURING METHOD THEREOF, AND OCB LIQUID CRYSTAL DISPLAY

(75) Inventors: Kuan-Cheng Lee, Shenzhen (CN); Xiaolong Ma, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 122 days.

(21) Appl. No.: 13/318,352

(22) PCT Filed: May 19, 2011

(86) PCT No.: PCT/CN2011/074363
§ 371 (c)(1),
(2), (4) Date: Oct. 31, 2011

(87) PCT Pub. No.: WO2012/151763
PCT Pub. Date: Nov. 15, 2012

(65) Prior Publication Data
US 2012/0287387 A1    Nov. 15, 2012

(30) Foreign Application Priority Data

May 10, 2011  (CN) .......................... 2011 1 0120081

(51) Int. Cl.
*G02F 1/1337* (2006.01)
(52) U.S. Cl.
USPC .......................................... 349/124; 349/117
(58) Field of Classification Search
None
See application file for complete search history.

(56) References Cited

U.S. PATENT DOCUMENTS

| 6,222,605 B1 | 4/2001 | Tillin et al. |
| 2002/0167631 A1 | 11/2002 | Ishihara et al. |
| 2010/0208183 A1* | 8/2010 | Kim .............................. 349/124 |

FOREIGN PATENT DOCUMENTS

| CN | 1693970 A | 11/2005 |
| CN | 101023392 A | 8/2007 |
| CN | 101082724 A | 12/2007 |
| CN | 101566762 A | 10/2009 |
| CN | 101762909 A | 6/2010 |

* cited by examiner

Primary Examiner — Lucy Chien
(74) Attorney, Agent, or Firm — Cheng-Ju Chiang

(57) ABSTRACT

The present invention discloses a manufacturing method of an Optically Compensated Bend (OCB) liquid crystal panel, which comprises: an arranging step S1 for alternately arranging a plurality of thin-film transistor (TFT) substrates and a plurality of color filter (CF) substrates, the TFT substrates and the CF substrates are coated with optical alignment material; a light irradiating step S2 for using an ultraviolet (UV) light source to irradiate the TFT substrates and the CF substrates so that alignment films of predetermined alignment directions are formed by the optical alignment material on the TFT substrates and the CF substrates; and an attaching step S3 for attaching each of the TFT substrates and an adjacent one of the CF substrates in such a way that an alignment direction of the TFT substrate is the same as that of the corresponding CF substrate and filling an OCB liquid crystal layer therebetween to form a plurality of OCB liquid crystal panels. For the OCB liquid crystal panel of the present invention, the TFT substrates and the CF substrates are optically aligned in a contactless way, the efficiency of each irradiation is high, which is favorable for mass production.

6 Claims, 3 Drawing Sheets

OCB LIQUID CRYSTAL PANEL AND MANUFACTURING METHOD THEREOF, AND OCB LIQUID CRYSTAL DISPLAY

TECHNICAL FIELD

The present invention generally relates to the field of display, and particularly, to an Optically Compensated Bend (OCB) liquid crystal panel and a manufacturing method thereof, and also to an OCB liquid crystal display (LCD).

BACKGROUND

As is well known, alignment films are needed in liquid crystal panels to determine an initial guide angle (a pretilt angle) of liquid crystal molecules. Generally, the liquid crystal molecules are aligned by rubbing alignment films.

In the prior art, Optically Compensated Bend (OCB) mode liquid crystal panels also adopts the rubbing alignment method. Firstly, proportions of compositions of the alignment film are adjusted, and then the alignment film is applied onto a substrate. Then, the surface of the alignment film is rubbed, and a liquid crystal layer is filled. Thus, alignment of the liquid crystal molecules of the OCB mode liquid crystal panels is completed. However, in the case of utilizing the rubbing alignment, the alignment film layer tends to peel off and generates impurities that may contaminate the alignment film.

Additionally, the process flow of rubbing alignment must be controlled at a high precision and is difficult to control in operation. This makes it inconvenient to perform the alignment, resulting in a decreased efficiency in manufacturing the OCB liquid crystal panels.

SUMMARY OF THE INVENTION

In order to solve the technical problems with the prior art that alignment films of the OCB liquid crystal panels are prone to contamination and the manufacturing process is inefficient, it is necessary to provide a manufacturing method of an OCB liquid crystal panel, in which the alignment film is less prone to contamination and the manufacturing efficiency is high, and further provide an OCB liquid crystal panel and an OCB liquid crystal display (LCD).

To achieve the aforesaid objective, the present invention provide a manufacturing method of an OCB liquid crystal panel, comprising:

an arranging step S1 for providing at least one upper substrate and at least one lower substrate, wherein the at least one upper substrate and the at least one lower substrate are coated with an optical alignment material;

a light irradiating step S2 for using an ultraviolet (UV) light source to irradiate the optical alignment material of the at least one upper substrate and the at least one lower substrate so that alignment films of a predetermined alignment direction are formed on the at least one upper substrate and the at least one lower substrate; and an attaching step S3 for attaching the at least one upper substrate and the at least one lower substrate and filling an OCB liquid crystal layer therebetween to form a plurality of OCB liquid crystal panels.

In another embodiment, in the arranging step S1, a plurality of upper substrates and a plurality of lower substrates are provided and arranged alternately in an order of an upper substrate-a lower substrate-an upper substrate-a lower substrate along a horizontal direction.

In another embodiment, each of the upper substrates comprises an upper substrate first end and an upper substrate second end, and each of the lower substrates comprises a lower substrate first end and a lower substrate second end. In the arranging step S1, each of the upper substrates is firstly rotated by 180° relatively to an adjacent lower substrate in a horizontal plane, and then the upper substrates and the lower substrates are arranged alternately in such a way that the upper substrate first end of each of the upper substrates adjoins the lower substrate first end of one of the lower substrates and the upper substrate second end of the upper substrate adjoins the lower substrate second end of another lower substrate.

In the light irradiating step S2, firstly the UV light source is moved to irradiate one of the upper substrates from the upper substrate first end to the upper substrate second end, then an adjacent one of the lower substrates is transferred to the original position of the irradiated upper substrate, and the UV light source is moved in an opposite direction to irradiate the lower substrate from the lower substrate first end to the lower substrate second end.

In the attaching step S3, the upper substrates are vertically rotated by 180° relatively to the lower substrates and then attached onto the lower substrates.

Each of the upper substrates comprises an upper substrate first end and an upper substrate second end, and each of the lower substrates comprises a lower substrate first end and a lower substrate second end. In the arranging step S1, the upper substrate first end of each of the upper substrates adjoins the lower substrate second end of an adjacent one of the lower substrates and the upper substrate second end of the upper substrate adjoins the lower substrate first end of another adjacent lower substrate.

In the light irradiating step S2, the UV light source scans one of the upper substrates from the upper substrate first end to the upper substrate second end, and then scans an adjacent lower substrate from the lower substrate first end to the lower substrate second end. In the attaching step S3, the upper substrates are rotated by 180° in the horizontal plane and then vertically rotated by 180° so as to be attached onto the lower substrates.

One of the upper substrates and the lower substrates is a thin-film transistor (TFT) substrate, and the other of the upper substrates and the lower substrates is a color filter (CF) substrate.

To solve the aforesaid technical problems, another technical solution adopted by the present invention is as follows: an OCB liquid crystal panel, which is manufactured by the aforesaid manufacturing method.

To solve the aforesaid technical problems, another technical solution adopted by the present invention is as follows: an OCB liquid crystal display, comprising the aforesaid OCB liquid crystal panel.

The embodiments of the present invention have the following benefits: by applying an optical alignment material to the upper substrate and the lower substrate and using the UV light source to irradiate the optical alignment material to form the alignment films, the problem that the alignment film layers tend to peel off to cause contamination when the rubbing alignment is performed can be effectively overcome; moreover, the process is simple and allows for rapid irradiating a plurality of substrates by using one UV light source, so the manufacturing efficiency is increased, which is favorable for mass production.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present invention in detail.

Figure 1:
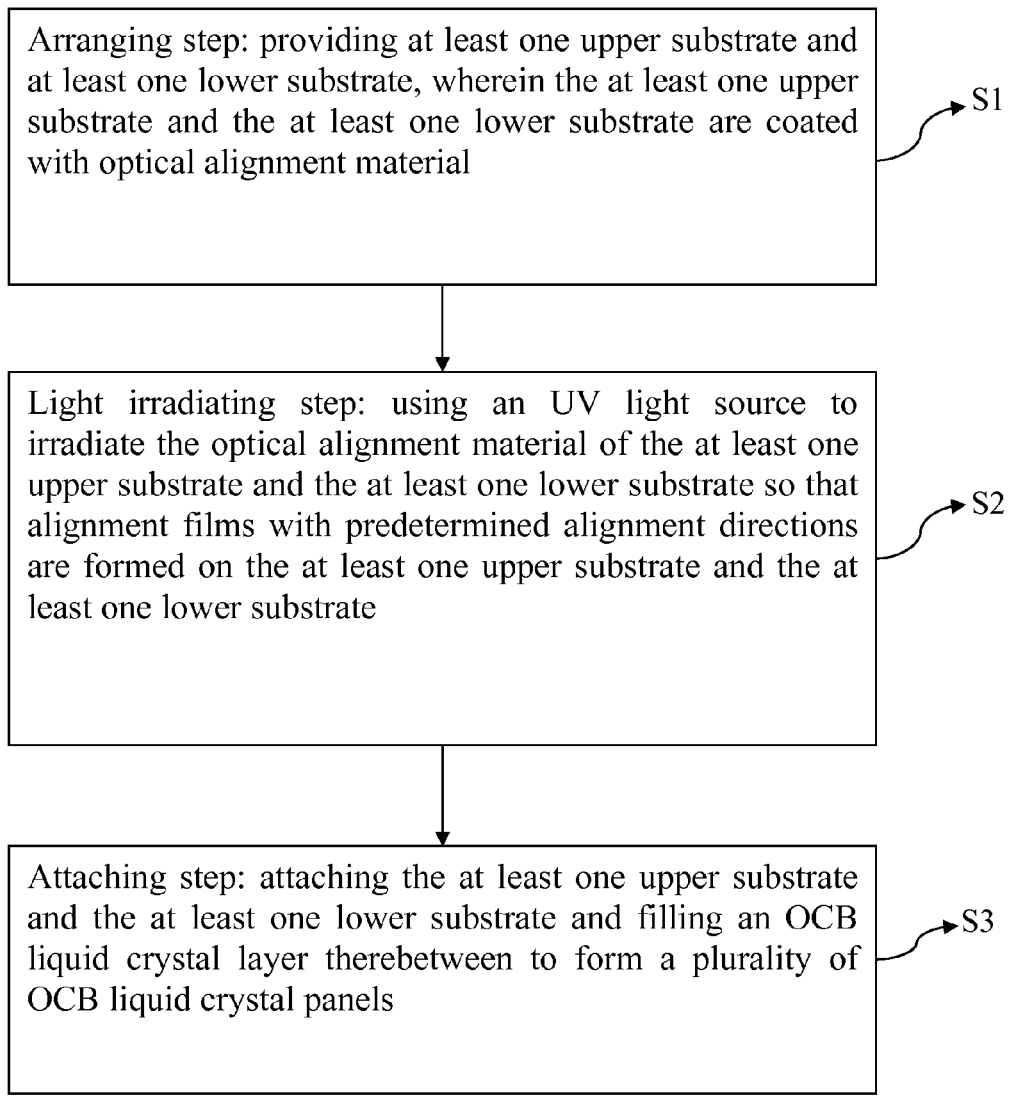
FIG. 1 is a schematic flowchart of an embodiment of a manufacturing method of an OCB liquid crystal panel of the present invention.

Referring to FIG. 1, there is shown a schematic flowchart of an embodiment of a manufacturing method of an OCB liquid crystal panel of the present invention.

In this embodiment, the manufacturing method of an OCB liquid crystal panel of the present invention comprises the following steps of:

an arranging step S1 for providing at least one upper substrate and at least one lower substrate, wherein the at least one upper substrate and the at least one lower substrate are coated with an optical alignment material, and the optical alignment material may be a resin containing photosensitive groups;

a light irradiating step S2 for using an UV light source to irradiate the optical alignment material of the at least one upper substrate and the at least one lower substrate, when the UV light source irradiates the at least one upper substrate and the at least one lower substrate, macromolecules of the optical alignment material adjust an alignment direction automatically, and the alignment direction is parallel with the irradiation direction of the UV light source, so that alignment films of a predetermined alignment direction are formed on the at least one upper substrate and the at least one lower substrate. The alignment direction refers to a direction in which liquid crystal molecules near the surfaces of the substrates are projected on the substrate when no voltage is applied (in an OFF state).

an attaching step S3 for attaching the at least one upper substrate and the at least one lower substrate in such a way that an alignment direction of the at least one upper substrate is the same as that of the at least one lower substrate, and filling an OCB liquid crystal layer therebetween to form a plurality of OCB liquid crystal panels, liquid crystal molecules of the OCB liquid crystal layer near the alignment film adjust a pretilt direction automatically according to the alignment direction.

In the practical manufacturing process, the optical alignment and the attaching steps may be performed on only one upper substrate and one lower substrate to produce OCB liquid crystal panels one by one.

Furthermore, in the present invention, a plurality of upper substrates and a plurality of lower substrates may be provided, and it may be that one of the upper substrates and the lower substrates is a TFT substrate and the other of the upper substrates and the lower substrates is a CF substrate. Hereinafter, description will be made with the TFT substrate as a lower substrate and the CF substrate as an upper substrate.

Compared to the prior art, the manufacturing method of an OCB liquid crystal panel of the present invention by using the UV light source to irradiate the optical alignment material to form the alignment films so that the pretilt angle of the liquid crystal molecules are more exactly controlled by the OCB liquid crystal panel. Moreover, in the optical alignment, alignment of the alignment films can be accomplished simply by using the UV light source to irradiate the alignment films without contacting with the alignment film layers, thereby overcoming the problem in the rubbing alignment that the alignment film layers tend to peel off or deteriorate to contaminate the alignment films. Furthermore, the process of using light irradiation for alignment is simple and can rapidly irradiate a plurality of substrates by using one UV light source, which increases the manufacturing efficiency, which is favorable for mass production.

Figure 2:
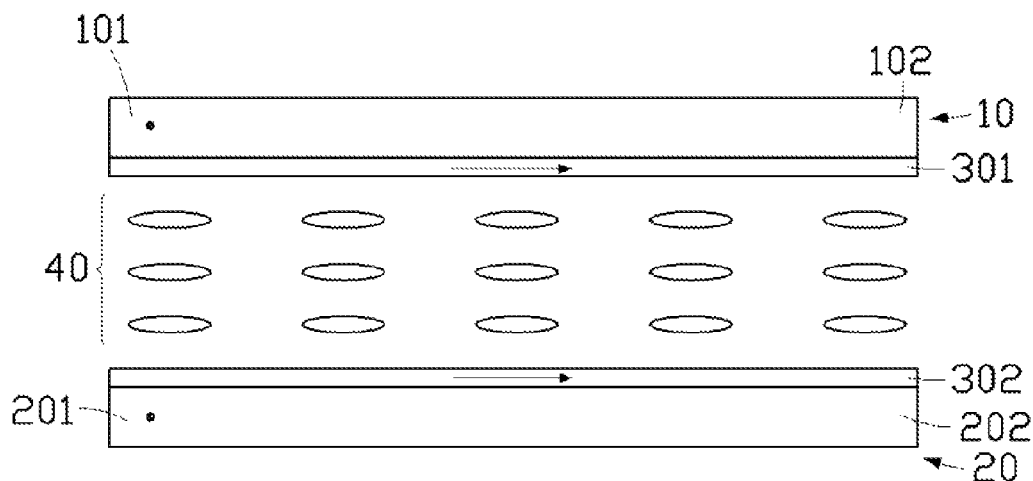
FIG. 2 is a schematic structure view of an embodiment of an OCB liquid crystal panel of the present invention.

Referring to FIG. 2, there is shown a schematic structure view of an OCB liquid crystal panel of the present invention. The OCB liquid crystal panel is manufactured by the aforesaid manufacturing method.

The OCB liquid crystal panel comprises a TFT substrate 10, a CF substrate 20, a first alignment film 301, a second alignment film 302 and a liquid crystal layer 40. The liquid crystal layer 40 is sandwiched between the TFT substrate 10 and the CF substrate 20.

The first alignment film 301 is sandwiched between the TFT substrate 10 and the liquid crystal layer 40, and the second alignment film 302 is sandwiched between the liquid crystal layer 40 and the CF substrate 20. The TFT substrate 10 comprises a TFT substrate first end 101 and a TFT substrate second end 102, and the CF substrate 20 comprises a CF substrate first end 201 and a CF substrate second end 202. An end of the TFT substrate 10, which is marked with a black dot, is the TFT substrate first end 101; and correspondingly, an end of the CF substrate 20, which is marked with a black dot, is the CF substrate first end 201. The TFT substrate first end 101 and the CF substrate first end 201 are located at a same end of the OCB liquid crystal panel, and the TFT substrate second end 102 and the CF substrate second end 202 are located at the other end of the OCB liquid crystal panel.

The first alignment film 301 has an alignment direction from the TFT substrate first end 101 to the TFT substrate second end 102, as shown by an arrow in FIG. 2. The second alignment film 302 has an alignment direction from the CF substrate first end 201 to the CF substrate second end 202, as shown by an arrow in FIG. 2. The alignment direction of the first alignment film 301 is the same as that of the second alignment film 302.

The TFT substrate 10 may further comprise a layer of a transparent material (not shown) known to people skilled in the art or a layer of some other material, which will not be detailed in the present invention.

The liquid crystal layer 40 comprises OCB mode liquid crystal molecules, which are filled in the liquid crystal layer 40 and arranged symmetrically. The OCB mode liquid crystal molecules can be compensated by each other.

Figure 3:
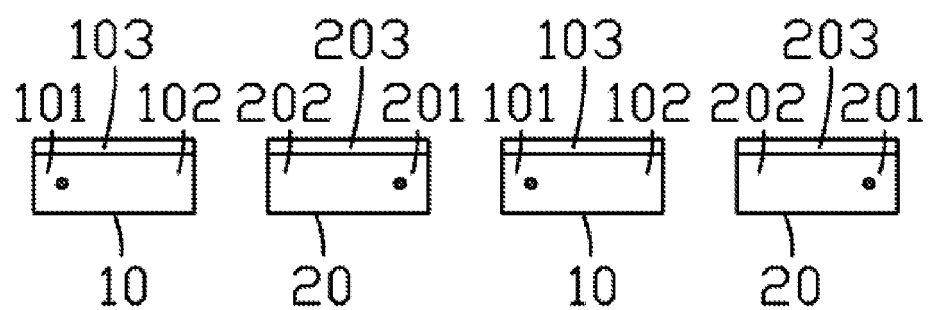
FIG. 3 is a schematic view illustrating a way of arranging TFT substrates and CF substrates of the OCB liquid crystal panel of FIG. 2 in an arranging step.

Referring to FIG. 3, there is shown a schematic view illustrating a way of arranging the TFT substrates 10 and the CF substrates 20 in the arranging step S1. In the arranging step S1, each of the CF substrates 20 is firstly rotated by 180° relatively to the TFT substrates 10 in a horizontal plane, and then the TFT substrates 10 and the CF substrates 20 are arranged alternately in an order of a TFT substrate 10, a CF substrate 20, a TFT substrate 10, a CF substrate 20 along a horizontal direction. The TFT substrate first end 101 of each of the TFT substrates 10 adjoins the CF substrate first end 201 of an adjacent one of the CF substrates 20, and the TFT substrate second end 102 of the TFT substrate 10 adjoins the CF substrate second end 202 of another adjacent CF substrate 20. The TFT substrates 10 are coated with a first optical alignment material 103, and the CF substrates 20 are coated with a second optical alignment material 203.

Figure 4:
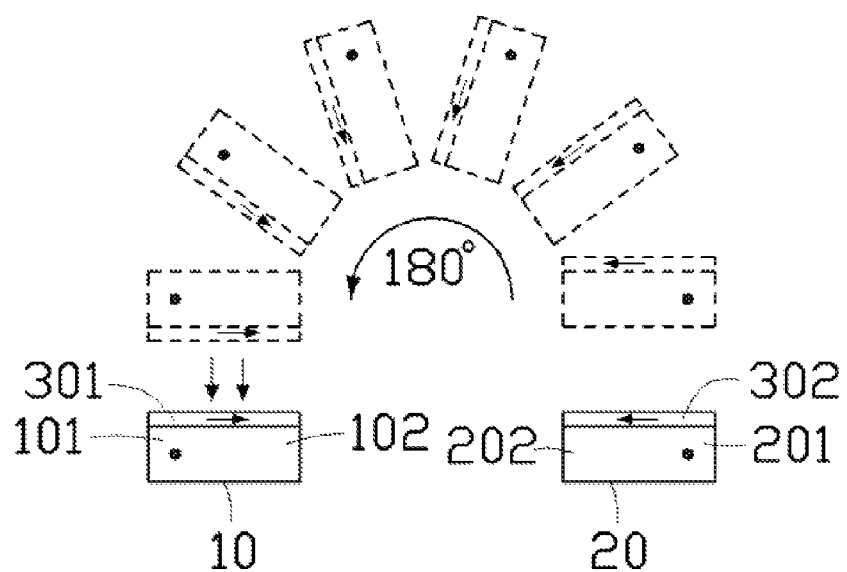
FIG. 4 is a schematic view of a process of attaching the TFT substrates and the CF substrates that are arranged in the way shown in FIG. 3.

In the light irradiating step S2, firstly, the UV light source is moved to irradiate one of the TFT substrates 10 from the TFT substrate first end 101 to the TFT substrate second end 102; then, an adjacent one of the CF substrates 20 is transferred to the original position of the irradiated TFT substrate 10, and the UV light source is moved in an opposite direction to irradiate the CF substrate 20 from the CF substrate first end 201 to the CF substrate second end 202. In this way, the first optical alignment material 103 coated on the TFT substrates 10 and the second optical alignment material 203 coated on the CF substrates 20 are irradiated by the UV light source to form the first alignment film 301 and the second alignment film 302 respectively as shown in FIG. 4. The alignment direction of the first alignment film 301 is from the TFT substrate first end 101 to the TFT substrate second end 102. The alignment direction of the second alignment film 302 is from the CF substrate first end 201 to the CF substrate second end 202.

In this embodiment, the UV light source and the TFT substrates 10 as well as the CF substrates 20 are moved alternately, and the movement directions of the TFT substrates 10 and the CF substrates 20 are parallel with that of the UV light source.

Referring to FIG. 4 again, there is shown a schematic view of a process of attaching the TFT substrates 10 and the CF substrates 20 that are arranged in way shown in FIG. 3. In the attaching step S3, each of the CF substrates 20 is vertically rotated by 180° and then attached onto an adjacent one of the TFT substrates 10. After the attachment, the CF substrate first end 201 of the CF substrate 20 and the TFT substrate first end 101 of the TFT substrate 10 are located at the same end of the OCB liquid crystal panel; and the alignment film on the CF substrate 20 and the alignment film on the TFT substrate 10 have the same alignment direction.

In other embodiments, in the arranging step S1, the TFT substrate 10 may be rotated by 180° relatively to the CF substrate 20 in the horizontal plane. In the attaching step S3, the CF substrate 20 may be fixed, the TFT substrate 10 is rotated by 180° vertically and then attached onto the CF substrate 20.

In the embodiment shown in FIG. 3 and FIG. 4, the UV light source is moved to and fro to irradiate the TFT substrates 10 and the CF substrates 20, which saves time, increases the efficiency and be favorable for continuous mass production. Additionally, the UV light source is moved to and fro; and the TFT substrates 10 and the CF substrates 20 arranged in an array are sequentially transferred to the irradiation position of the UV light source at a specified speed; therefore, a substrate can be irradiated immediately after alignment of the previous substrate is completed. Moreover, the transferring direction of the TFT substrates 10 and the CF substrates 20 is parallel with the movement directions of the UV light source, thereby reducing the room needed for installing the irradiating device.

Figure 5:
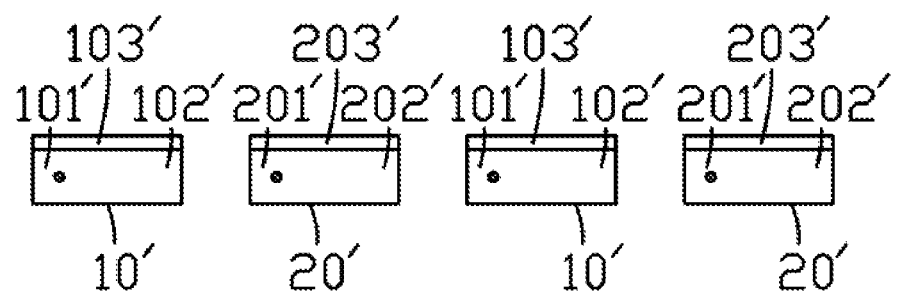
FIG. 5 is a schematic view illustrating another way of arranging the TFT substrates and the CF substrates of the OCB liquid crystal panel of FIG. 2 in the arranging step.

Referring to FIG. 5, there is shown a schematic view of another way of arranging the TFT substrates 10 and the CF substrates 20 in the arranging step S1. In the arranging step S1, the TFT substrates 10 and the CF substrates 20 are arranged alternately in an order of a TFT substrate 10, a CF substrate 20, a TFT substrate 10 a CF substrate 20 along the horizontal direction. The TFT substrate first end 101 adjoins the CF substrate second end 202 of the CF substrates 20 adjacent the TFT substrate first end 101, and the TFT substrate second end 102 adjoins the CF substrate first end 201 of the CF substrate 20 adjacent the TFT substrate second end 102. Different from the way shown in FIG. 3, the CF substrates are not firstly rotated by 180° in the horizontal plane. The TFT substrates 10 are coated with the first optical alignment material 103, and the CF substrates 20 are coated with the second optical alignment material 203.

Figure 6:
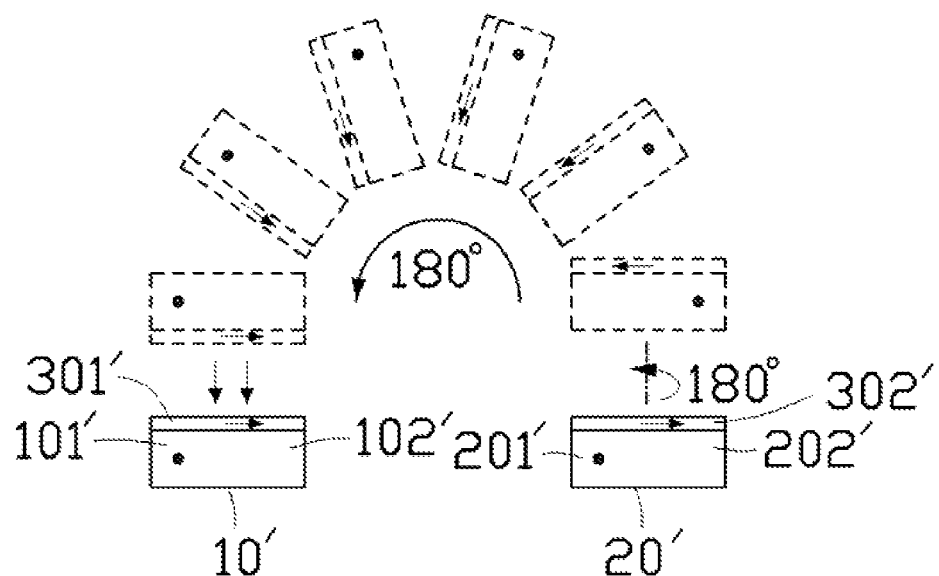
FIG. 6 is a schematic view of a process of attaching the TFT substrates and the CF substrates that are arranged in the way shown in FIG. 5.

In the light irradiating step S2, the UV light source irradiates the TFT substrates 10 and the CF substrates 20 sequentially. With the UV light source being fixed, the TFT substrates 10 and the CF substrates 20 are sequentially transferred to the UV light source for alignment. The UV light source irradiates one of the TFT substrates from the TFT substrate first end 101 to the TFT substrate second end 102, and then irradiates an adjacent CF substrate 20 from the CF substrate first end 201 to the CF substrate second end 202. In the same way, the TFT substrates 10 and the CF substrates 20 sequentially pass through the irradiation area of the UV light source to be irradiated. In this way, the first optical alignment material 103 on the TFT substrates 10 and the second optical alignment material 203 on the CF substrates 20 are irradiated by the UV light source to form the first alignment film 301 and the second alignment film 302 respectively as shown in FIG. 6. The alignment direction of the first alignment film 301 is from the TFT substrate first end 101 to the TFT substrate second end 102. The alignment direction of the second alignment film 302 is from the CF substrate first end 201 to the CF substrate second end 202.

The UV light source can be either moved or fixed when used for irradiation. In this embodiment, the UV light source is fixed and the TFT substrates 10 and the CF substrates 20 are sequentially transferred to the UV light source through the production line; however, the present invention is not limited thereto, and it may also work to keep the TFT substrates 10 and the CF substrates 20 fixed but to move the UV light source for irradiation.

Referring to FIG. 6 again, there is shown a schematic view depicting a process of attaching the TFT substrates 10 and the CF substrates 20 that are arranged in the way shown in FIG. 5. In the attaching step S3, each of the CF substrates 20 is rotated by 180° in the horizontal plane and then vertically rotated by 180° so as to be attached onto an adjacent one of the TFT substrates 10. After the attachment, the CF substrate first end 201 of the CF substrate 20 and the TFT substrate first end 101 of the TFT substrate 10 are located at the same end of the OCB liquid crystal panel, and a alignment direction of the alignment film on the CF substrate 20 is same as that of and the alignment film on the TFT substrate 10. As a result, liquid crystal molecules of the OCB mode liquid crystal display are symmetrically arranged between an upper side of the CF substrate 20 and a lower side of the TFT substrate 10.

In the embodiments shown in FIG. 5 and FIG. 6, with the UV light source being fixed, the TFT substrates 10 and the CF substrates 20 are sequentially transferred to the irradiation area for optical alignment purpose. Different from the embodiments shown in FIG. 3 and FIG. 4, it is unnecessary to move the UV light source to and fro for irradiation and the TFT substrates 10 and the CF substrates 20 are transferred at a uniform speed without stopping, so the optical alignment is accomplished more rapidly and the manufacturing efficiency is increased.

The present invention further provides an OCB liquid crystal display, which comprises the aforesaid OCB liquid crystal panel. The OCB liquid crystal display of the present invention may further comprise a polarizer, a drive power source, a backlight module and the like, which will be readily appreciated by people skilled in the art and thus will not be further described herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method of an Optically Compensated Bend (OCB) liquid crystal panel, comprising:
    an arranging step S1 for providing at least one upper substrate and at least one lower substrate, wherein the at least one upper substrate and the at least one lower substrate are coated with an optical alignment material;
    a light irradiating step S2 for using an ultraviolet (UV) light source to irradiate the optical alignment material of the at least one upper substrate and the at least one lower substrate so that alignment films with predetermined alignment directions are formed on the at least one upper substrate and the at least one lower substrate; and
    an attaching step S3 for attaching the at least one upper substrate and the at least one lower substrate and filling an OCB liquid crystal layer therebetween to form a plurality of OCB liquid crystal panels;
    wherein in the arranging step S1, a plurality of upper substrates and a plurality of lower substrates are provided and arranged alternately in an order of an upper substrate-a lower substrate-an upper substrate-a lower substrate along a horizontal direction;
    wherein each of the upper substrates comprises an upper substrate first end and an upper substrate second end, and each of the lower substrates comprises a lower substrate first end and a lower substrate second end, and wherein in the arranging step S1, each of the upper substrates is firstly rotated by 180° relatively to an adjacent lower substrate in a horizontal plane, and then the upper substrates and the lower substrates are arranged alternately in such a way that the upper substrate first end of each of the upper substrates adjoins the lower substrate first end of one of the lower substrates and the upper substrate second end of the upper substrate adjoins the lower substrate second end of another lower substrate.

2. The manufacturing method of claim 1, wherein in the light irradiating step S2, firstly the UV light source is moved to irradiate one of the upper substrates from the upper substrate first end to the upper substrate second end, then an adjacent one of the lower substrates is transferred to the original position of the irradiated upper substrate, and the UV light source is moved in an opposite direction to irradiate the lower substrate from the lower substrate first end to the lower substrate second end.

3. The manufacturing method of claim 2, wherein in the attaching step S3, the upper substrates are vertically rotated by 180° relatively to the lower substrates and then attached onto the lower substrates.

4. The manufacturing method of claim 1, wherein one of the upper substrates and the lower substrates is a thin film transistor (TFT) substrate, and the other of the upper substrates and the lower substrates is a color filter substrate.

5. An Optically Compensated Bend (OCB) liquid crystal panel, which is manufactured by a method comprising the following steps of:
    an arranging step S1 for providing at least one upper substrate and at least one lower substrate, wherein the at least one upper substrate and the at least one lower substrate are coated with an optical alignment material;
    a light irradiating step S2 for using an ultraviolet (UV) light source to irradiate the optical alignment material of the at least one upper substrate and the at least one lower substrate so that alignment films with predetermined alignment directions are formed on the at least one upper substrate and the at least one lower substrate; and
    an attaching step S3 for attaching the at least one upper substrate and the at least one lower substrate and filling an OCB liquid crystal layer therebetween to form a plurality of OCB liquid crystal panels,
    wherein in the arranging step S1, a plurality of upper substrates and a plurality of lower substrates are provided and arranged alternately in an order of an upper substrate-a lower substrate-an upper substrate-a lower substrate along a horizontal direction;
    wherein each of the upper substrates comprises an upper substrate first end and an upper substrate second end, and each of the lower substrates comprises a lower substrate first end and a lower substrate second end, and wherein in the arranging step S1, each of the upper substrates is firstly rotated by 180° relatively to an adjacent lower substrate in a horizontal plane, and then the upper substrates and the lower substrates are arranged alternately in such a way that the upper substrate first end of each of the upper substrates adjoins the lower substrate first end of one of the lower substrates and the upper substrate second end of the upper substrate adjoins the lower substrate second end of another lower substrate.

6. An Optically Compensated Bend (OCB) liquid crystal display (LCD), comprising an OCB liquid crystal panel, wherein the OCB liquid crystal panel is manufactured by a method comprising the following steps of:
    an arranging step S1 for providing at least one upper substrate and at least one lower substrate, wherein the at least one upper substrate and the at least one lower substrate are coated with an optical alignment material;
    a light irradiating step S2 for using an ultraviolet (UV) light source to irradiate the optical alignment material of the at least one upper substrate and the at least one lower substrate so that alignment films with predetermined alignment directions are formed on the at least one upper substrate and the at least one lower substrate; and
    an attaching step S3 for attaching the at least one upper substrate and the at least one lower substrate and filling an OCB liquid crystal layer therebetween to form a plurality of OCB liquid crystal panels;
    wherein in the arranging step S1, a plurality of upper substrates and a plurality of lower substrates are provided and arranged alternately in an order of an upper substrate-a lower substrate-an upper substrate-a lower substrate along a horizontal direction;
    wherein each of the upper substrates comprises an upper substrate first end and an upper substrate second end, and each of the lower substrates comprises a lower substrate first end and a lower substrate second end, and wherein in the arranging step S1, each of the upper substrates is firstly rotated by 180° relatively to an adjacent lower substrate in a horizontal plane, and then the upper substrates and the lower substrates are arranged alternately in such a way that the upper substrate first end of each of the upper substrates adjoins the lower substrate first end of one of the lower substrates and the upper substrate second end of the upper substrate adjoins the lower substrate second end of another lower substrate.

* * * * *